April 2, 1957  A. S. GILL, JR  2,787,354
MAGNETIC PARTICLE CLUTCH CONTAINING AN ADDITIVE
Filed Feb. 23, 1954
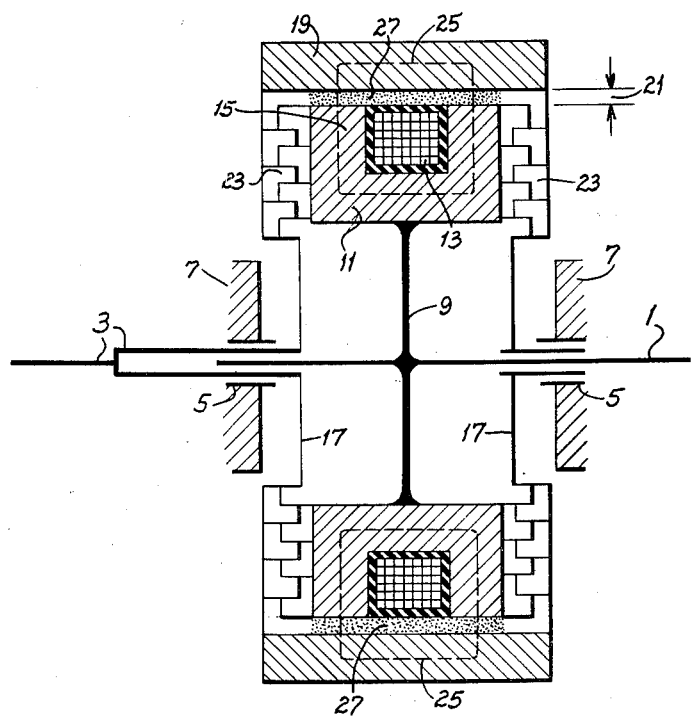
Andrew S. Gill Jr.,
Inventor.
Koenig and Pope,
Attorneys.

United States Patent Office 2,787,354
Patented Apr. 2, 1957

2,787,354

MAGNETIC PARTICLE CLUTCH CONTAINING AN ADDITIVE

Andrew S. Gill, Jr., Maple Heights, Ohio, assignor to Eaton Manufacturing Company, Cleveland, Ohio, a corporation of Ohio Application February 23, 1954, Serial No. 411,814

10 Claims. (Cl. 192—21.5)

This invention relates to magnetic couplings useful as clutches, brakes and the like, and more particularly to a magnetic coupling of this type incorporating in its magnetic gap a mixture in dry form of finely divided magnetizable material and an additive.

Among the several objects of the invention may be noted the provision of a magnetic coupling incorporating in its gap a magnetic mixture containing a ferromagnetic component with a suitable additive adapted to provide comparatively high torque transmission with comparatively low drag and break-away torque; the provision of a coupling of the class described wherein said additive will cause the mixture to withstand, without deterioration, such high local temperatures as are prone to occur in magnetic clutch mixtures when operating under certain conditions; and the provision of a coupling of the class described in which both wear and so-called torque fading are minimized. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

The single figure of the accompanying drawing, which in connection with the specification illustrates various possible embodiments of the invention, is a diagrammatic axial section of a typical clutch incorporating the invention.

Referring to the drawing, there is shown a driving member 1 and a relatively rotary driven member 3, supported coaxially in suitable bearings 5 in a frame 7. The driving and driven relationship between members 1 and 3 may be interchanged. Moreover, the driven member may be nonrotary so as to function as a brake, instead of what is generally referred to as a clutch, when neither of the members 1 or 3 is stationary. It is also to be understood that the nonrotary member, without completely rotating, may rock to some degree in its bearings to apply torque to suitable scales to measure force, so that the device may function as a dynamometer.

A supporting spider 9 is carried on the driving member 1 for a ferromagnetic (iron, for example) field member 11, which carries an annular field coil 13 flanked by polar members 15. The members 15 are diagrammatically illustrated and may have uninterrupted outer annular surfaces; or, if desired, they may be formed as polar teeth, as is known. Attached to the driven member 3 is a casing 17 which supports a ferromagnetic (iron, for example) inductor drum 19, separated from the field member 11 by a magnetic gap indicated at 21. The radial dimension of this gap is minimized as much as possible, being on the order of 1/32–1/8 inch in ordinary practice. Annular labyrinth seals are diagrammatically shown at 23, which seal off the gap 21 from the bearings 5. The inside and outside relationship of the members 11 and 19 may be interchanged.

By exciting the annular field coil 13 through a suitable circuit (not shown), there will be generated a toroidal flux field, as diagrammatically indicated at 25. This magnetic field surrounds the coil 13 and interlinks the ferromagnetic members 11 and 19. The magnetomotive force in the field is in a proportion to the ampere turns of the coil 13. When the coil is deenergized, the field substantially disappears, except for small amounts of residual magnetism that may remain.

In the space between members 11 and 19 is carried a magnetic mixture 27 which is traversed by the field 25 of coil 13. The result, as is known in the art, is to stiffen or increase the reactive shear forces in the mixture 27 in some proportion to the strength of the magnetic field. This results in the member 1 driving the member 3, with or without slip, depending upon the field strength. At partial excitations of coil 13, various degrees of rotary slip occur with heating in the mixture, but with sufficient excitation the driving and driven members become locked together and synchronized in their movements.

The ferromagnetic base of the mixture 27 may be composed of a finely divided ferromagnetic material such as finely divided (preferably powdered) iron or iron alloy, as set forth, for example, in United States Patent 2,519,449. In the category of powdered iron are Carbonyl-E iron, Swedish powdered iron or powdered electrolytic iron. Preferable, however, are ferromagnetic materials which are less corrodible, for example, finely divided (preferably powdered) stainless steel or the other materials set forth in the application of William S. Goff, Serial No. 334,019, filed January 29, 1953, for Magnetic Couplings, now abandoned. The materials referred to in this paragraph will hereinafter be referred to as those in a first category.

As disclosed in the patent application of Ralph L. Jaeschke, Serial No. 393,180, filed November 19, 1953, for Magnetic Couplings, there may be added to the finely divided ferromagnetic material, finely divided (preferably powdered) additives such as aluminum oxide, chromic oxide or barium carbonate. The addition of one or more of these agents (preferably aluminum oxide) is important in certain high-capacity designs of the present invention but is optional in others. The materials referred to in this paragraph will hereinafter be referred to as those in a second category.

My invention comprises combining with the above-mentioned finely divided ferromagnetic materials in the first category (with or without the above-mentioned finely divided additives in the second category) one or more of the following five finely divided (preferably powdered) materials; columbium carbide, titanium carbide, tungsten carbide, tantalum carbide and cobalt oxide. These five materials will hereinafter be referred to as those in a third category. I have found that the employment of any one or more of the five additives in the third category provides a mixture adapted to withstand high operating temperatures, without introducing excessive drag and break-away torque upon release, while at the same time providing for a wide range of desired torque transmission under locked driving conditions and without fading of torque during the lifetime of the apparatus. These materials also inhibit wear on the coupling, brake or clutch parts. That is to say, in the form in which they exist in the mixtures contemplated herein, wear is minimized.

A satisfactory mixture is constituted by one in which, taking the amount by weight of a ferromagnetic material in the first category as 100 parts, the total weight of any one or more of the additives of the group in the third category consisting of columbium carbide, titanium carbide, tungsten carbide, tantalum carbide or cobalt oxide is from approximately ½ part to 7 parts.

If one of the materials constituted by the group in the second category including aluminum oxide, chromic oxide or barium carbonate is to be included in the mixture as above set forth, the parts by weight of any one or more of these materials to be added range from approximately ¼ part to 4 parts for each 100 parts of ferromagnetic material.

A satisfactory particle size for any of the finely divided materials in each of the three categories mentioned is one which will just pass a 200-mesh screen, but it is to be understood that this is variable and may range from what will just pass a 50-mesh screen, down to particle sizes of 4 microns in diameter.

I have found that a mixture of powdered magnetic stainless steel (from the first category), powdered titanium carbide (from the third category) and powdered aluminum oxide (from the second category) is at present considered to be the optimum and preferred, particularly in the construction of automobile clutches. The proportions of these may be within the ranges above specified. As already made clear, the stainless steel powder component in this mixture is preferable to powdered iron, because of its ability better to withstand corrosion, including oxidation at elevated temperatures. The titanium carbide powder is preferable because it best inhibits wear. The addition of the aluminum oxide powder minimizes breakaway torque.

It has been found that the improvements set forth in said Jaeschke application Serial No. 393,180 provide mixtures which are preferable in so-called heavy-duty designs and applications of magnetic fluid clutches. Magnetic fluid clutches which employ only a ferromagnetic powder with a so-called lubricant are preferable for light-duty operation. The magnetic fluid clutches most benefited by the mixtures set forth herein are preferable for intermediate duty. It is to be understood, however, that this statement is not to be taken as restrictive.

In view of the above, it will be seen that the several objects of the invention are achieved and other advantageous results attained.

As various changes could be made in the elements above described without departing from the scope of the invention, it is intended that all matter contained in the above description or shown in the accompanying drawing shall be interpreted as illustrative and not in a limiting sense.

I claim:

1. In a magnetic coupling characterized by relatively rotatable members spaced from one another by a magnetic gap and having means for generating a flux field interlinking the members through the gap; a finely divided coupling material in said gap comprising a finely divided ferromagnetic material selected from the group consisting of iron and a ferromagnetic alloy, and a minor portion by weight of a finely divided additive adapted to minimize wear, said additive being selected from the group consisting of columbium carbide, titanium carbide, tungsten carbide, tantalum carbide and cobalt oxide.

2. A magnetic coupling made according to claim 1, including a minor portion by weight of another finely divided additive selected from the group consisting of aluminum oxide, chromic oxide and barium carbonate adapted to reduce break-away torque.

3. A magnetic coupling made according to claim 1, wherein the parts by weight of said additive range from approximately ½ to 7 parts for each 100 parts of the ferromagnetic material.

4. A magnetic coupling made according to claim 2, wherein the parts by weight of the additive adapted to reduce wear range from approximately ½ to 7 parts for each 100 parts of the ferromagnetic material, and the parts by weight of said other additive adapted to reduce break-away torque range from approximately ¼ to 4 parts for each 100 parts of the ferromagnetic material.

5. In a magnetic coupling characterized by relatively rotatable members spaced from one another by a magnetic gap and having means for generating a flux field interlinking the members through the gap; a finely divided coupling material in said gap comprising a major portion by weight of a ferromagnetic alloy which is substantially noncorrodible at elevated temperatures, and a minor portion by weight of finely divided titanium carbide.

6. In a magnetic coupling characterized by relatively rotatable members spaced from one another by a magnetic gap and having means for generating a flux field interlinking the members through the gap; a finely divided coupling material in said gap comprising 100 parts by weight of a ferromagnetic alloy which is substantially noncorrodible at elevated temperatures, and a minor portion by weight of finely divided titanium carbide, the parts by weight of said titanium carbide ranging from approximately ½ to 7.

7. In a magnetic coupling characterized by relatively rotatable members spaced from one another by a magnetic gap and having means for generating a flux field interlinking the members through the gap; a finely divided coupling material in said gap comprising a major portion by weight of a ferromagnetic alloy which is substantially noncorrodible at elevated temperatures, a minor portion by weight of finely divided titanium carbide and a minor portion by weight of finely divided aluminum oxide.

8. A coupling made according to claim 7, wherein the amount by weight of the ferromagnetic alloy is 100 parts, the amount by weight of said titanium carbide ranges from approximately ½ to 7 parts, and the amount by weight of said aluminum oxide ranges from approximately ¼ to 4 parts.

9. In a magnetic coupling characterized by relatively rotatable members spaced from one another by a magnetic gap and having means for generating a flux field interlinking the members through the gap; a finely divided coupling material in said gap comprising a major portion by weight of finely divided magnetic stainless steel and minor portions by weight of finely divided titanium carbide and aluminum oxide.

10. A coupling made according to claim 9, wherein the amount by weight of the stainless steel is 100 parts, the amount by weight of said titanium carbide ranges from approximately ½ to 7 parts, and the amount by weight of said aluminum oxide ranges from approximately ¼ to 4 parts.

References Cited in the file of this patent

UNITED STATES PATENTS 2,452,530    Snock ----------------- Oct. 26, 1948

OTHER REFERENCES

Investigation of Magnetic Mixtures for Clutch Application, AIEE Transactions, vol. 72, part III, 1953, pages 88–92.

Induced Fibration of Suspensions, Journal of Applied Physics, vol. 20, December 1949, pages 1137–1140.